United States Patent [19]
Zollinger et al.

[11] Patent Number: 5,999,947
[45] Date of Patent: Dec. 7, 1999

[54] DISTRIBUTING DATABASE DIFFERENCES CORRESPONDING TO DATABASE CHANGE EVENTS MADE TO A DATABASE TABLE LOCATED ON A SERVER COMPUTER

[75] Inventors: John M. Zollinger, Salt Lake City, Utah; Johnathan Devine, San Francisco, Calif.

[73] Assignee: Arkona, LLC, Salt Lake City, Utah

[21] Appl. No.: 08/863,680

[22] Filed: May 27, 1997

[51] Int. Cl.⁶ ................................................. G06F 17/30
[52] U.S. Cl. ................................ 707/203; 707/1; 707/201
[58] Field of Search ................................. 707/203, 1, 3, 707/201; 711/113, 5; 395/200.59

[56] References Cited

U.S. PATENT DOCUMENTS

| | | | |
|---|---|---|---|
| 5,261,094 | 11/1993 | Everson et al. | 395/600 |
| 5,341,498 | 8/1994 | Connor et al. | 395/600 |
| 5,493,728 | 2/1996 | Solton et al. | 711/113 |
| 5,600,834 | 2/1997 | Howard | 395/617 |
| 5,634,052 | 5/1997 | Morris | 707/1 |
| 5,682,524 | 10/1997 | Freund et al. | 711/5 |
| 5,689,697 | 11/1997 | Edwards et al. | 707/3 |
| 5,689,708 | 11/1997 | Regnier et al. | 395/200.59 |
| 5,737,536 | 4/1998 | Herrman et al. | 709/229 |
| 5,752,042 | 5/1998 | Cole et al. | 395/712 |
| 5,758,355 | 5/1998 | Buchanan | 707/201 |
| 5,765,171 | 6/1998 | Gehani et al. | 707/203 |
| 5,832,487 | 11/1998 | Olds et al. | 707/10 |
| 5,870,765 | 2/1999 | Bauer et al. | 707/203 |
| 5,873,088 | 2/1999 | Hayashi et al. | 707/100 |
| 5,884,324 | 3/1999 | Cheng et al. | 707/201 |

*Primary Examiner*—Paul R. Lintz
*Assistant Examiner*—Ella Colbert
*Attorney, Agent, or Firm*—Workman, Nydegger & Seeley

[57] ABSTRACT

A method, computer program product, and system that allows changes made to an original database table found on a server computer to be reflected in client copies of the database table based on intermittent client requests for synchronization. A server makes periodic updates of table differences between a current table receiving database change events and a reference table. Each client copy of a database table and update created by the server has a sequential version number associated therewith. The server will compare the version number of a client copy of a database table with the most recent version number of the table on the server to determine which updates need be applied in order to make the client copy current. Next, the updates will be translated from a generic format into instructions that are specific to the type of database engine being run on the client. Finally, the instructions are transmitted to the client (along with the new version number) so that the client may operate the database engine to apply the instructions for making the database table current with the original managed on the server.

14 Claims, 6 Drawing Sheets

FIG. 1

| NAME | LETTER GREETING | EMPLOYEE NUMBER | MARITAL STATUS |
|---|---|---|---|
| JONES, G.J. | MR. JONES | 7843 | SINGLE |
| PRESLEY, E. | MR. PRESLEY | 8782 | MARRIED |
| SMITH, T.O. | MRS. SMITH | 1703 | MARRIED |
| WRIGHT, H.D. | MISS WRIGHT | 0813 | SINGLE |

FIG. 2A

| NAME | LETTER GREETING | EMPLOYEE NUMBER | MARITAL STATUS |
|---|---|---|---|
| JONES, G.J. | MR. JONES | 7843 | MARRIED |
| MAUSS, B. | MR. MAUSS | 7777 | SINGLE |
| SMITH, T.O. | MRS. SMITH | 1703 | MARRIED |
| WRIGHT, H.D. | MISS WRIGHT | 0813 | SINGLE |

FIG. 2B

| NAME | LETTER GREETING | EMPLOYEE NUMBER | MARITAL STATUS |
|---|---|---|---|
| JONES, G.J. | MR. JONES | 7843 | MARRIED |
| MAUSS, B. | MR. MAUSS | 7777 | SINGLE |
| SMITH, T.O. | MRS. SMITH | 1703 | MARRIED |
| YOUNG, H.D. | MRS. YOUNG | 0813 | MARRIED |

FIG. 2C

| NAME | TITLE | LETTER GREETING | EMPLOYEE NUMBER | MARITAL STATUS |
|---|---|---|---|---|
| JONES, G.J. | ASSOCIATE ATTORNEY | MR. JONES | 7843 | MARRIED |
| MAUSS, B. | PRESIDENT | MR. MAUSS | 7777 | SINGLE |
| SMITH, T.O. | NURSE | MRS. SMITH | 1703 | MARRIED |
| YOUNG, H.D. | OFFICE MANAGER | MRS. YOUNG | 0813 | MARRIED |

FIG. 2D

| UPDATE 1.1 |
|---|
| M: R1, C4 => MARRIED |
| A: AFTER R1 => MAUSS, B. ... |
| D: R2 |

FIG. 3A

| UPDATE 1.2 |
|---|
| M: R4, C1 => YOUNG, H.D. |
| M: R4, C2 => MRS. YOUNG |
| M: R4, C3 => MARRIED |

FIG. 3B

VERSION 1.0 (FIG. 2A) => VERSION 1.1 (FIG. 2B) => VERSION 1.2 (FIG. 2C) => VERSION 1.3 (FIG. 2D)

VERSION 1.0 (FIG. 3A)    VERSION 1.2 (FIG. 3B)

DISTRIBUTING DATABASE DIFFERENCES CORRESPONDING TO DATABASE CHANGE EVENTS MADE TO A DATABASE TABLE LOCATED ON A SERVER COMPUTER

BACKGROUND OF THE INVENTION

1. The Field of the Invention

The field of the present invention pertains to distributing changes made to a database, database table, or other data store on a server computer out to read-only copies of the data store found on one or more client computers. More specifically, the invention deals with distributing such database changes in a manner that efficiently uses system resources and is quickly achieved. Another area of the present invention pertains to client systems that are intermittently (as apposed to continuously) connected to a server system requiring communication and synchronization of information on both systems.

2. Present State of the Art

In many situations, it is desirable to distribute an original database, database table, or other data store on a server computer to one or more client computers at various locations. Furthermore, when the original data store at the server is changed in some way (e.g., the addition, deletion, or modification of a record) it is desirable to distribute those changes out to the various client copies of the data store or database table so that the client copies may be current with the original.

A data store is any form of information readable with the assistance of a general purpose computer. The most common type of data store are traditional databases but any form of data storage may require that changes made to an original data store on server to be distributed outward to client copies of that data store. For illustration purposes, a database table is used throughout as an example of a data store, though many other kinds of data store exist.

The client copies of the original data store or elements thereof such as a database table are in one respect read-only copies since any changes made by the client will not be distributed back to the original. This differentiates the present area of the invention from the art of data replication wherein a change made to any copy of the database must be replicated at every other database or database table.

The usefulness of information distribution from an original data store to client representation of the data store is manifest in applications where the client is a remote laptop computer that is only intermittently connected for brief periods of time with the centralized server computer. The client copy of the database information may be used on the remote laptop computer even when the computer is not connected to the server over a communications network.

One example of such an environment arises in field servicing where a field service representative making client visits may only connect with the home office centralized computer system (server) in indeterminable and infrequent intervals, such as nightly in a hotel room or a couple times per week. In this environment, the field representative may use a parts list database that includes price information. Such a price list could be distributed out to the sales representative as client copies of the original price list maintained at the home office. As the part list is changed (e.g., adding a new part or changing the price of an existing part) such changes should be distributed out to the remote client as the need arises so that the client copies of the parts list will be current with the original parts list.

One way to distribute changes made to a database or database table is to download the entire table each time a client makes a connection with the server. While practical when a data store is relatively small, a larger database or database table will require large amounts of bandwidth on the communications link. This will make for an expensive and time consuming transfer that, in many instances, will be intolerable and impracticable.

Another way is to make a comparison of the client representation of the database (or other form of data store) and the original database on the server at the time that the client makes a connection with the server. Such dynamic comparisons require large amounts of hand shaking and data transfer between the client and the server, but eventually allow only the changes necessary for making the client current to be transmitted from the server to the client which in turn will update the client database.

One major drawback of this method is the inefficient use of the servers processing resources. Each client will synchronize at a different time and require the comparison between the original database and the client copy of the database to be made many times. The impact of this inefficiency increases drastically as the number of clients increase and the frequency of the intermittent connection and request for synchronization increases.

What is generally sought in database change distribution systems described above are ways to quickly send the minimum amount of information needed to update a remote data store. This allows the client to quickly make a connection with the server, download only the necessary and sufficient amount of information, and make changes to the client copy of the data store without expending undue time or computing resources.

Another attribute of distributing a data store, such as a database or database table, from a server computer to one or more clients is, in many instances, the presumption that the exact same type of data store or database engine and format exists on the client side as exists on the server side. This attribute and presumption can make deployment of such systems costly by requiring the purchase of a specific type of database engine for every client using the system. Furthermore, the original database tables or databases desired for remote distribution may be managed by many different database engines thereby requiring each client to use or maintain multiple database engines.

It would therefore be an advance in the art to allow client representations of a data store to be managed by a different type of data store engine than that managing the server data store. This would allow a single data store engine to be found on each client that could handle multiple data stores, such as databases or collections of documents, that are originally created and managed on the server by different types of data store engines. Furthermore, existing data store and database engines found on a particular client system may be leveraged without necessitating the purchase of new or different data store engines in order to integrate with a system of distributing copies of a data store, such as a database table, as described previously.

SUMMARY AND OBJECTS OF THE INVENTION

It is an object of the present invention to quickly deliver database changes made to an original database table on a server to a requesting client so that the client may apply the differences to make the client copy of the database table current.

It is another object of the present invention to create and store difference updates that can be used for quickly sending database table differences to a client for use in making a client copy of a database table current.

It is a further object of the present invention to translate database changes to instructions that can be understood by a particular type of database engine residing on a client computer thereby allowing the client to update the client copy of a particular database table in order to make it current.

It is yet another object of the present invention to provide client copies of database tables to be managed by different database engines and yet contain the same data and the same general organization.

It is a general object of the present invention to allow database changes made to a data store located on a server to be distributed out to client copies of the data store in an efficient and timely manner.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, computer program product, and system for distributing changes made in a data store to remote client copies of the data store is provided.

The present invention creates and stores updates of table differences that are used to make client copies of a particular database table current. Each update is made by comparing a current copy of a database table with a reference copy of the same database table with the update being given a version identifier, such as a sequential version number. The updates are created periodically as needed, thereby requiring that a database table comparison be done only once per relevant table change regardless of how many clients later use the updates as part of synchronizing the client copy of the database table. Furthermore, the updates isolate only the information that has changed over time so that a minimum amount of data may be sent to a client. Finally, the updates are stored in a generic format so that they may be translated to specific database engine instructions corresponding to the actual type of database engine residing on a particular client.

A client will initially receive a client copy of a database table having a particular version identifier, such as a version number, date stamp, etc. At some later time, the client will reconnect with the server to request synchronization of the client copy of the database table to make it current with the original database table that is on the server. The version identifier of the client copy of the database engine is accessed and all intervening updates are then translated into instructions that are understood by the type of database engine run on the client system. This allows the client copy of the database table to be made current with the original database table found on the server by the particular database engine running on the client system. For a sequentially numbered version number used as a version identifier, all updates having a larger number than that of the client copy of the database table are used to make the client copy current. The client copy of the database table is then given the latest version identifier and is considered current. Depending on when or how often a client connects with the server, one or multiple updates may used in order to make the client copy of the database table current.

In one embodiment, a profile database is used in order to validate clients and store pertinent information regarding client status. Such client information may include the database tables stored as copies on the client system, current version identifiers of the database tables stored on the client system, the type of database engine running on the client system, etc. While discussed in the context of database tables, the present invention can be applied to any type of data store.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited invention and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 3A–3B are diagrams showing the contents of two particular updates with FIG. 3A showing the changes that occurred between FIG. 2A and FIG. 2B while FIG. 3B shows the changes that occurred between FIGS. 2B and 2C;

DETAILED DESCRIPTION OF THE PREFERRED EMBODIMENTS

As used herein, the term "component" or "engine" refers to computer software instructions that achieve a particular function. Many components or functional entities may be found within the same program or process.

As used herein, the term "server application" refers to software written according to the client-server model and that runs on a server computer. A "server" as used herein refers to a server application running on a server computer. A server is designed to communicate with, and process requests from, client software running on one or more client computers which may be continuously or intermittently connected to a communications network allowing communication with the server.

A client is any computer process separate from the server process that either resides on the same computer or has a physical connection through a communications network to the server process, whether intermittent or continuously. A "client system" or "client computer" as used herein refers to client software running on a client computer corresponding to, or interacting with, a server process. The client system becomes logically connected to a server in order to communicate requests or messages for processing to the server. A "client" as used herein may refer to a client system or the human operator of the client system depending on context. Note that a client and a server may be sharing the same physical hardware allowing the client and server to communicate using interprocess communication; they need not be on separate physical hardware.

A "communications network" as used herein is to be interpreted broadly and includes, but is not limited to, interprocess communication, local area networks, telecommunications networks, wide area networks, modem connections, etc. Typically, a communications network will comprise a physical component or physical connection that is made up of the wiring, interface cards, and other hardware combined with a specified information sharing protocol and associated software. Furthermore, actual transportation of physical media, such as a floppy disk or tape, between two computers may be used as an equivalent of a communications network.

A "storage means" is defined broadly to incorporate any type of device interfaceable to a computer that is used to memorize information and includes both long-term and short-term storage. Thus, storage means would include, though not be limited to, cache memory, RAM, disk storage, tape storage, etc. Furthermore, storage means contemplates the entire system of storage incorporated by a computer in combination so that the RAM, cache, and disk drive together could be considered a storage means. A storage means can also be logically partitioned so that items are stored in different media or in different parts of the same media. For example, a storage means comprising RAM and disk storage could be logically partitioned so that item A is stored in a portion of RAM (first partition), item B is stored in another portion of RAM (second partition), and item C is stored on disk (third partition).

As used herein, the term "database" or "data store" refers to any collection of information that can be read or accessed by a program running on a general purpose computer. While this definition entails standard database formats, such as SQL databases, it also contemplates other entities such as computer files that may have any form of data contained thereon, or collections of files. For example, a set of documents, each document being a file in the format of a standard word processor, would constitute a data store. Furthermore, the data within a file or traditional database is unlimited as to its meaning. In other words, the data could be sound data, video images, statistical information, etc.

As used herein, the term "database table" or "table" refers to the row/column organization of data in a standard SQL database. Again, the cells or elements of a database table may contain data or information that is unlimited in its nature. Data sources can also organize information in entity, attribute, and relationship form (in addition to other forms).

As used herein, the term "database engine" or "data store engine" refers to a software program that can understand and interact with a particular data store. Such a database engine would include varieties of SQL database engines, such as Microsoft® Access™, or Borland® Paradox™; as well as word processors, such as Microsoft® Word, and other programs that may read or organize computer information. Traditional data source types include, but are not limited to the following: relational, hierarchal, object-relational, object oriented, flat files, etc. Furthermore, a database engine must be able to process database instructions in order to change database contents and may consist of multiple software components acting in harmony one with another. A data source type simply identifies a particular class or implementation of an engine such as a Microsoft® Access™ SQL database engine.

As used herein, a "database change event" is anything that changes the state of a database, such as additions, deletions, or modification of records. Furthermore, other types of events may make changes to a database including, by way of example and not limitation, sorting a database, adding an extra field or column to a database table, changing "metadata" parameters such as passwords, permissions, logins, structure, etc.

As used herein, the term "update" refers to a set of differences on a particular database taken between two separate states of that database or database table. Generally, there is the current copy of the database or the database table which typically has the most recent changes and a reference database or database table that has been "frozen" so that differences may be measured. The term "sequentially" as used herein in connection with update creation means that updates are created one after another and that there is some way of distinguishing the order of creation whether by a numbering system, a date or time stamp, etc. Furthermore, some updates may be supersets or collections of other updates and the same differences may exist in more than one update depending on implementation or profile.

Figure 1:
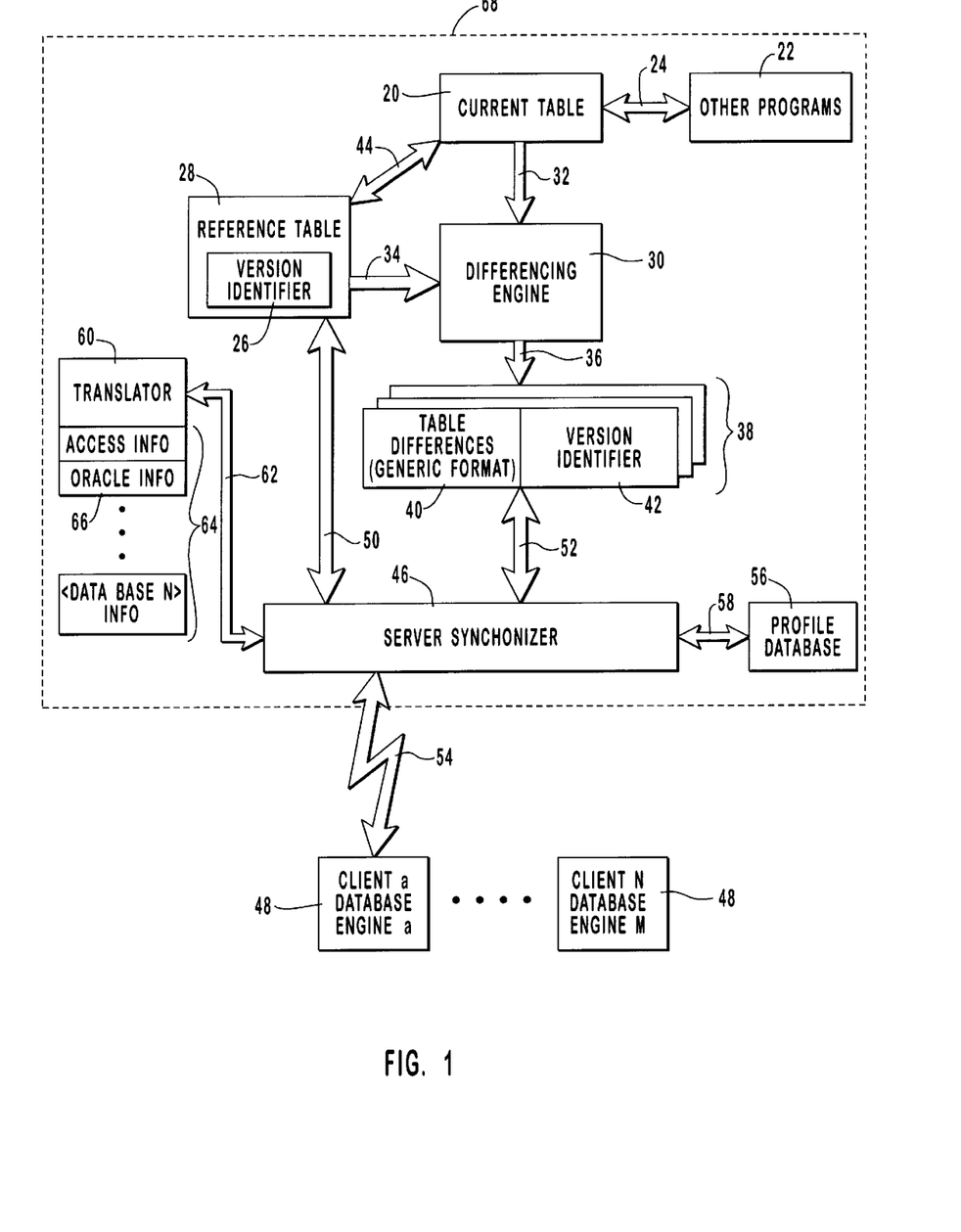
FIG. 1 is a block diagram illustrating the architecture of a system implementing the method of the present invention wherein a server synchronizer component will communicate intermittently with one or more clients in order to distribute changes made to a data base table on the server out to the respective client copy of the database table upon client request.
Figure 2A:
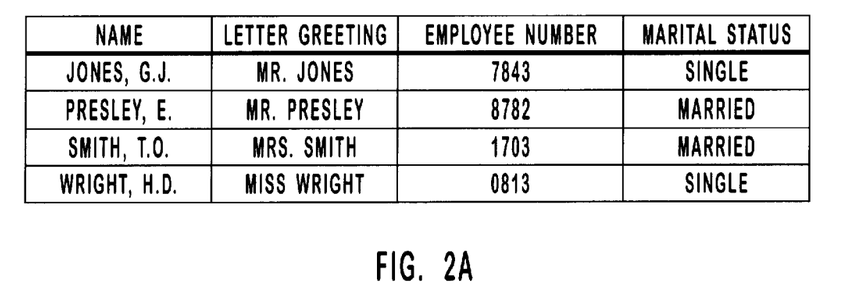
FIGS. 2A–2D are diagrams showing the state of an example database table of employee information at four different moments in time.

Referring now to FIG. 1, a block diagram of one embodiment of the present invention is shown wherein a database table is maintained at a centralized location on a server. The current table 20 may be continuously accessed and updated by other programs 22, such as database engines and user applications as represented by arrow 24. Because of being constantly updated by other programs 22, the current table 20 will be in a continuously changing state.

A reference table 28 is maintained so that changes to the current table 20 may be measured against a known state. Furthermore, a version identifier 26 is associated with the reference table 28 that will be sequentially incremented as the reference table 28 is changed as will be explained in more detail hereafter.

A differencing engine 30 will take as input the current table 20 as represented by directional arrow 32 and the reference table 28 as represented by the directional arrow 34 in order to compute the differences between the two tables. The output of the differencing engine 30, indicated by directional arrow 36, produces a series of updates 38. Each update of the series of updates 38 will contain the table differences 40 between a particular state of the current table 20 and a particular version of the reference table 28 as well as a version identifier 42 that will correspond to the version of the reference table 28 upon which the update was made.

Preferably, the version identifier is sequentially numbered for ease in determining which updates to apply in order to synchronize a client copy of the database table. After an update is made and stored as part of the series of update 38, the current table 20 is copied to the reference table 28 as indicated by arrow 44 so that the next update in the series will contain only those changes since the previous update. Additionally, the version identifier 26 for the reference table 28 is incremented to distinguish the various editions of the reference table 28.

The server synchronizer component 46 is responsible for sending the initial database copy to one or more clients and updating or synchronizing the client's copy of the database table whenever a client connects to the server and requests such update or synchronization. One or more clients, illustrated by the series of clients 48a–48n may utilize the services of the server synchronizer component 46 and have contained thereon a copy of the database table.

The block diagram of FIG. 1 illustrates the invention for a single database table for purposes of teaching the present invention and that actual implementations will likely have many different database tables with each client "subscribing" to one or more of the database tables. It should also be noted that the present invention extends beyond a database table and can be used for any form of database or stored information that would be distributed out to clients in read-only fashion. The invention applies particularly to clients that are only intermittently connected to the server synchronizer component 46.

One example of an intermittent connection environment would be the servicing example explained previously. In that environment, a parts database is centrally managed and updated but is used by field service representatives having laptop computers (i.e., clients). The field service representatives will only intermittently connect with the home office server computer on a periodic and often random basis ranging from a couple of times per day to weekly or even less frequently.

Referring back to FIG. 1, note that the client computers will not necessarily change the data in the client copies of the database table though this may occur in some circumstances. If such changes are made to the client copy of the database tables by the client, the changes will not be propagated back to the original table managed on the server computer and could actually be lost when update instructions are received by one of the clients 48a–48n.

The server synchronizer component 46 has access to the reference table 28 as represented by arrow 50 in order to transfer or copy the reference table 28 onto a respective client in the series of clients 48a–48n. Also, the server synchronizer component 46 will communicate with the series of updates 38 as represented by arrow 52 in order to use those updates in synchronizing the client copy of the database table located on a respective client system with the original database found on the server.

The intermittent connection between the server, being represented by all the components encircled by the dashed line 68, and each of the series of clients 48a–48n is represented by arrow 54. The nature of the communication represented by arrow 54 in a currently preferred embodiment is a direct modem connection, however, any communications network or method (i.e., by way of a disk or tape) may be used so that the communication path between client and server may be made. Furthermore, the logical connection (i.e., the actual contact between the client server or handshaking) may also occur intermittently over a continuous physical connection (e.g., LAN, over the Internet, interprocess communication, etc.).

When a client, such as client 48a, connects with the server synchronizer component 46 as represented by arrow 54, it will identify itself through some form of identifier in a synchronization request. The request may also include other information including the type of database engine that is native to the client, the copies of database tables currently resident on the client and their associated version numbers, etc.

The server synchronizer component 46 will also access a profile database 56 as represented by arrow 58 in order to validate clients. The profile database contains information on each client authorized to receive updates from the server synchronizer component 46 including, but not limited to or required depending upon implementation, the following information: a list of database tables authorized for update by the client; the version number for each authorized database table; the password to be used for verification of log in or other connection initiation; the database engine or engines natively running on the client and in the case of multiple engines, an association between the engines and the database table; and other information apparent to those skilled in the art.

The server synchronizer component 46 will also communicate with a translator component 60 as represented by arrow 62. The translator component is used for translating the table differences 40 contained in each update of the series of updates 38 from one format (e.g., a generic format) to a format specific to the type of database engine found on the particular client receiving the update(s). Furthermore, when the initial table is placed on the client, a translation between the reference table 28 may be necessary in order to transmit the information in the appropriate database-specific format required by the client.

Database information 64 is accessed by the translator component 62 according to the type of database engine found on the client. For example, client 48a may have an Oracle® database engine requiring the translator component 60 to access the relevant Oracle® information 66 in order to translate the table differences 40 in a number of different updates within the series of updates 38 prior to sending the specific instructions to the client 48a.

Those skilled in the art will note that certain functions of the described architecture may be handled either by the server 68 (specifically, the server synchronizer component 46) or a corresponding component running on the client system. For example, the client may track its own database engine type, current version of a client copy of client database table, etc. and notify the server synchronizer component 46 of these parameters in the synchronization request. Alternatively, the client may simply identify itself and all such information may be stored in the corresponding client entry of the profile database 56 that may be accessed by the server synchronizer component 46.

In either case, the server synchronizer component 46 will know or be able to ascertain the status of the client copy of the database table in order to determine which updates of the series of updates 38 need to be applied to that table in order to make it current. The server synchronizer component 46 will also be able to deliver the information that the translator component 60 will need in order to translate the table differences 40 from a generic format to the correct format or instructions for the type of database engine on the particular client requesting synchronization.

Generally, it is preferred to push as much information up to the centralized server as possible so that a client component that interfaces with the server has as little sophistication as possible. In other words, the client will simply receive instructions from the server that may be given to a database engine in order to apply the relevant updates to the client copy of the database table. In such a minimal implementation, the client component need only store its identifying information for communicating and identifying itself to the server synchronizer component 46. Additionally, minimal client software will have the ability to communicate with its native database engine, though client software may be so written that the same client code may be configured to interface with a variety of different types of database engines. Such an arrangement allows the client component to be very flexible when adding new types of database engines supported by the current system shown in FIG. 1.

Referring to FIGS. 2A–2D, different states of a database table having employee information are shown with each state at a different point in time and progressing sequentially in time from FIG. 2A to FIG. 2D. For illustration purposes, the database table is small both in terms of columns and rows and those skilled in the art will appreciate that a database table of any size may be used according to the concepts illustrated in the present invention. Furthermore, any form of database used interchangably in place of the database table is considered within the scope of the present invention, including but not limited to such things as data files, other databases organized other than row-column format, etc.

Figure 2B:
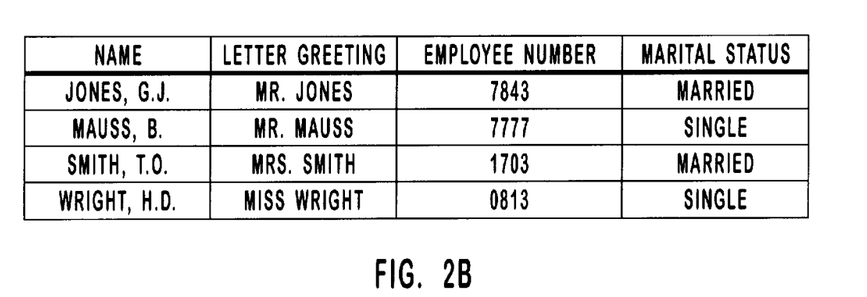
Figure 2C:
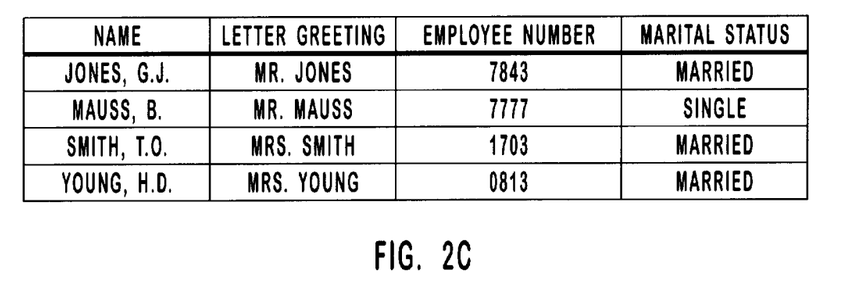
Figure 3A:
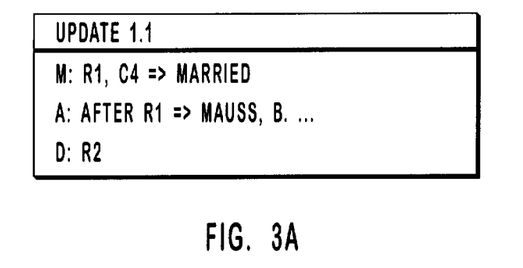
Figure 3B:
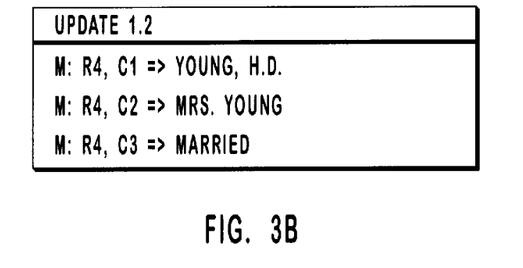

Referring to FIGS. 3A–3B, two updates organized in an arbitrary generic format are shown. Again, the format is chosen for illustration purposes only and those skilled in the art will appreciate that many different formats or conventions may be chosen. Specifically, FIG. 3A corresponds to the changes between the database table that occurred going from the state in FIG. 2A to the state in FIG. 2B. In other words, the database table shown in FIG. 2A is version 1.0 and the database table shown in FIG. 2B is version 1.1 and the update shown in FIG. 3A is update version 1.1. Applying update version 1.1 to the database table version 1.0 (FIG. 2A) will yield database version 1.1 (FIG. 2B). In like manner, FIG. 3B illustrates update version 1.2 that incorporates changes made to the database table from the state shown FIG. 2B to FIG. 2C.

Figure 4:
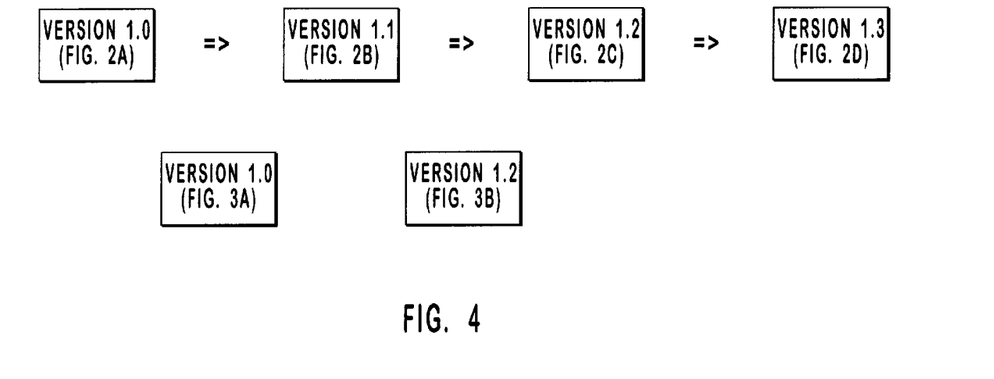
FIG. 4 is a block diagram showing the state of progression of FIGS. 2A–2D correlated with the changes represented in the updates shown in FIGS. 3A–3B.

Referring to FIG. 4, the relationships between the different table versions and the different update versions is shown for added clarity. Note that database table version 1.0 (FIG. 2A) may have update version 1.1 (FIG. 3A) and update version 1.2 (FIG. 3B) applied thereto to arrive at database table version 1.2 (FIG. 2C).

Figure 5:
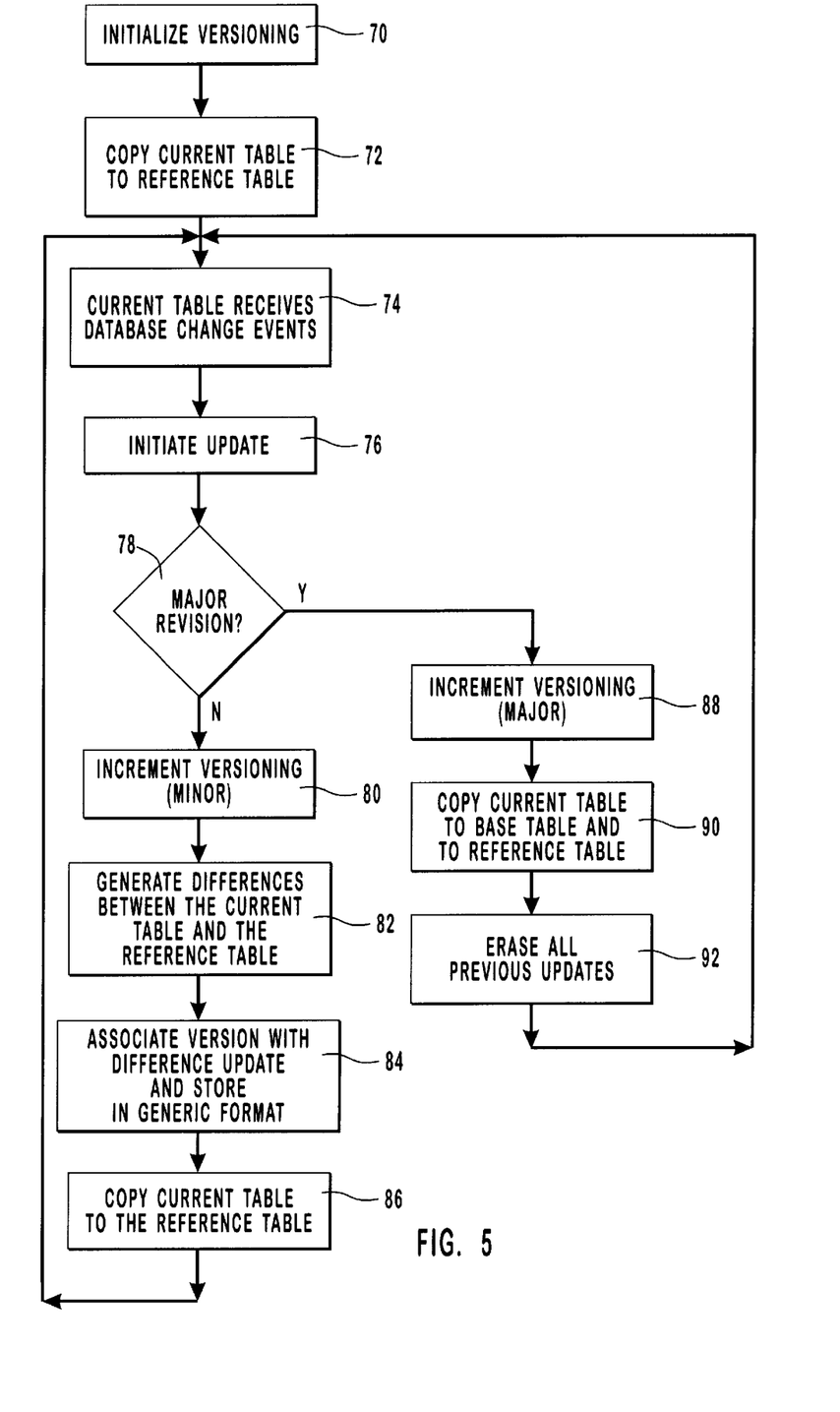
FIG. 5 is a flow chart showing the processing steps taken by the differencing engine of FIG. 1 to create an update of differences between the current state of a database table and a reference copy of the database table that may be used in generating and distributing database table differences to clients having client copies of the database table.

Referring now to FIG. 5, a flow chart is presented showing the processing steps taken in order to create the updates shown in FIGS. 3A and 3B. In addition, a two-tier revision process is shown that allows a database table to be copied in its entirety to the client should there be changes so significant that the updating process would actually be less efficient such as a structural change to the table or an excessive number of updates being stored at the server.

Initially, at step 70, the versioning is initialized to 1.0 which indicates the state of the reference table 28 after the current table 20 (FIG. 2A) is copied to the reference table 28 at step 72. Reference will be made throughout the discussion of the flow chart in FIG. 5 to the architectural block diagram shown in FIG. 1, the database table states illustrated in FIGS. 2A–2D, and the updates shown in FIGS. 3A and 3B.

Once the system is initialized, the current table will receive a number of database change events at steps 74 over a period of time. At a certain point, an update sequence is initiated at step 76. Those skilled in the art will appreciate that a large number of criteria may be used in selecting when the creation of an update is necessary or desirable. For example, updates may be initiated on a strictly periodic basis such as once per day or twice per week. Another alternative would track the number of database change events made to a particular database table and initiate update creation when a certain threshold of changes are made representing database change activity.

Naturally, hybrid combinations of periodic and database change activity may be used according to the implementation. Further, in a complex and robust system having many different database tables or other databases as contemplated by the present invention, each individual database table or database may have a unique update creation schedule.

At step 78 (FIG. 5), it is determined whether a major revision or conversely a minor revision is chosen for the update creation. A major revision may be indicated manually, automatically after so many updates have been made, based on significant structural changes made to the table requiring a re-copy of the table to the client, or any other relevant criteria. Typically, a major revision is required when the entire database table should be copied to a client such as at initial creation of the table or when the overhead of applying the many updates is greater than simply copying the table.

If a minor revision is determined at step 78, as in the case between the database table states shown in FIGS. 2A and 2B, the versioning is incremented at step 80 for a minor revision. In a currently preferred versioning system, major and minor revisions are separated by a decimal point, therefore in the current example, the version marker would increment from 1.0 to 1.1.

The differences arc generated between the current table 20 and the reference table 28 by the differencing engine 30 and stored as an update in the series of updates 38 (See FIG. 1). These differences are prepared as part of an update (e.g., update 1.1 shown in FIG. 3A).

Between the state of the database table in FIG. 2A and FIG. 2B, three changes were made. Namely, the employee in row one became married, a new employee was added (Mr. Mauss), and a former employee deleted at row 2 (Mr. Presley). In FIG. 3A, these changes are stored in an arbitrary generic format with a change-type indicator separated by a ":" followed by a location field separated by a "→" followed by the data of the change itself. For modifications to existing table cells, the change-type indicator is signified by a "M," the location of the cell is given by the row number and the column number, and the data is the new cell data. For additions of a new record or row, the change-type indicator is "A," the location field indicates after which row the new record should be inserted, and the data field indicates all the cells therein. Finally, a deletion will be signified by a "D" change-type indicator and the location field contains the row number to be deleted (no data is associated with a delete).

Once the differences have been generated at step 82, the differences are stored in generic format and the current version number (in this case 1.1) is associated with the difference update at step 84. Finally, the current table 20 (FIG. 2B) is copied to the reference table 28 (now also FIG. 2B) to complete the update sequence. Note that the current version number (at this point 1.1) is used to indicate both the newly copied reference table 28 as well as the update just created. Semantically, version 1.0 of the table having the update 1.1 applied thereto would be the same as version 1.1 of the table.

At the end of the update sequence, the current table goes back to receiving database change events at step 74 until another update creation is initiated at step 76. The same process will occur for creating update 1.2 as shown in FIG. 3B as was explained previously for creating update 1.1 shown in FIG. 3A. For the second update or update 1.2 shown in FIG. 3B, corresponding to the change in the table state from FIG. 2B to FIG. 2C, one employee, Ms. Wright, was married and had the relevant cells changed in the database table row. Again, after completion of the update sequence, the current table will receive database change events at steps 74 until another update sequence is initiated at step 76.

Figure 2D:
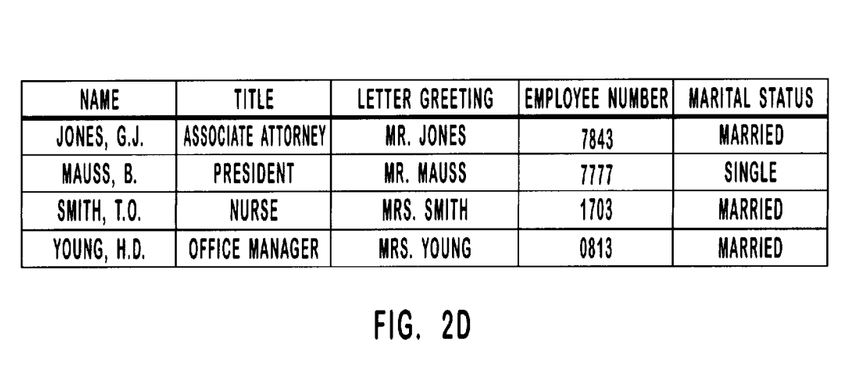

The differences in the table state from a state shown in FIG. 2C to that shown in FIG. 2D is a major structural change to the table. Namely, an entire column for the title of the employee is added. Depending on the capabilities of the system, such a structural change may not be represented in a generic format in an efficient manner. In other words, it could be more efficient to simply copy the table down to the client rather then send instructions for updating the table. Those skilled in the art will realize that various situations and parameters will effect this threshold determination and a system may be tuned or optimized to recognize this. For example, adding a column to a relatively small database table may be efficiently handled by simply copying the table down to the client while the same structural change to a large database table is more efficiently handled by storing an update. For the example shown illustrating the addition of the title column as shown in the table state change between FIG. 2C and FIG. 2D, a major revision is assumed for illustration purposes.

At step 78, a major revision is determined and the versioning is incremented at step 88 indicating a major revision. For the version numbering system used in one embodiment of the present invention, the number before the decimal point is incremented and the number after the decimal point is set to zero. In other words, the version would increment from 1.2 to 2.0.

Next, the current table 20 is copied to the reference table 28 at step 90 without any differencing being made. Finally, all previous updates will no longer be necessary since every update to this newest version level will require that the table be copied to the client in its entirety. Therefore, at step 92, all previous updates will be erased in order to release system resources. The effect of a major revision when receiving a request for an update is that the reference table 28 will be directly copied to the client regardless of the current version of the table on the client.

The version identifier may be other than the major/minor revision version number explained above. Another version identifier could be a date or time stamp that may be directly compared with other date or time stamps to determine which updates are needed to make a database table current. Furthermore, the date or time stamp may be combined with other version information such as the major/minor revision version numbering explained previously. For example, a client could simply ask for all updates since a certain date without tracking which version number it actually has. The server could compare the date to a file creation dates for the updates (if stored in a file) or other date and time stamp information in order to assure the correct updates are used to make the client copy of the database table current.

Figure 6:
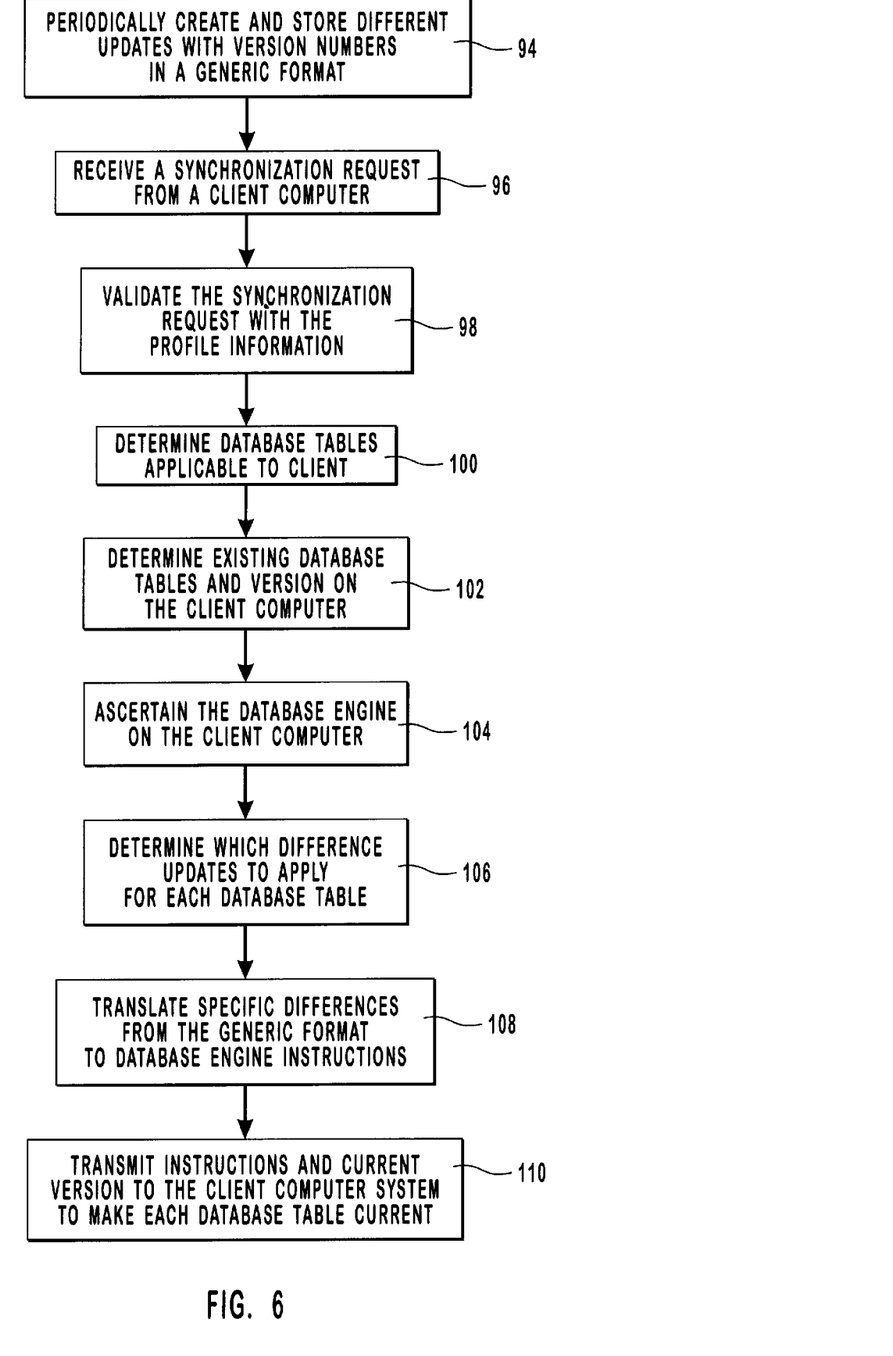
FIG. 6 is a flow chart showing the processing steps taken by the server synchronizer component of FIG. 1 in order to distribute the appropriate database table differences to a requesting client according to the present invention.

Referring to tie flow chart of FIG. 6, the processing steps necessarily taken by the server computer for implementing the present invention are shown. At step 94, difference updates are created with version numbers for all database tables in the system. Each database table will have client copies thereof on one or more of the various clients to the system. Furthermore such updates are stored in a generic format which may later be translated to database engine instructions destined for database engine types found on the appropriate client requesting synchronization. Typically, such updates are handled by the differencing engine 30 as shown in FIG. 1.

Next, the server synchronizing component 46 receives a synchronization request from a client computer at step 96. In one embodiment of the invention, a remote client will dial into the server computer using a modem and phone line as a communications network and "login" or otherwise identify itself and begin a session with the server computer.

The synchronization request is validated at step 98 making access to profile information in the profile database 56 as shown in FIG. 1. This is a security feature that assures that a valid client is receiving or requesting information from the server. Furthermore, the profile database information may also include reference to new database tables assigned to the client. The server synchronizer component 46 would then be required to communicate the new tables to a particular client at a later point in time as will be shown hereafter.

At step 100, the server synchronizer component 46 will determine which database tables are applicable to the client making the request. This information may be presented directly by the client itself in the request or references to applicable database tables may be stored in the profile information pertinent to that particular client. In either instance, the server synchronizer component 46 will be able to determine the appropriate database tables in step 100 and those skilled in the art will see many schemes and methods by which this may be accomplished.

At step 102, the state of the existing client copy of the database tables and their particular version number are determined, again this information may be provided in the request from the client or may be centrally stored in the profile database 56 or other area accessible to the synchronizer component 46. Note that some client copies of a database table may not yet exist at the client and will need to be copied over from the server.

Each client will have at least one database engine found thereon for creating and managing database tables. There are a number of different types or varieties of database engines that can be used by a client and the client will receive database table differences and/or database tables themselves in the appropriate format for the database engine associated with the database table or other data store. Furthermore, multiple database engines may be used by a client depending on the different data store copies that are managed by the client system.

The database engine type found in the client computer is ascertained at step 104 for the database table in question. Again, such information may be provided by the client in the synchronization request or this information may be found in the profile information for the client depending on the actual implementation.

For each database table, the server synchronizer component 46 will compare the version number of the client copy of the database table with the most current number of the original database table on the server. If the client version is less than the server version, all of the sequentially numbered intervening updates will be applied. For example, if the client requesting synchronization to the employee database table (See FIGS. 2A–2D) had version 1.0 and the latest version was 1.2, then update version 1.1 (FIG. 3A) and update version 1.2 (FIG. 3B) would be applied to the client copy of the database table in order to make it current. If another client had version 1.1 of the employee table then only update version 1.2 (FIG. 3B) need be applied in order to make the client copy of the database table current on that particular client. Finally, if the current version were 2.0, there would be no existing updates and the entire database table (i.e., reference table 28) would be copied down to both the client having version 1.1 and the client having version 1.0.

Before transmitting instructions to a particular client, the server synchronizer component 46 must interact with the translator component 60 in order to translate either the differences taken from the updates or the entire database table itself into a format or instructions understood by the type of database engine running on the client. Having previously ascertained the database engine type at step 104, this information is passed to the translator component 60 which will access the particular database engine type within the database engine information 64 so that a proper translation may occur. Finally, at step 110, for each database table at the client, the instructions and current version number of the database table are transmitted to the client so that the client may make the client copy of the database table current.

Figure 7:
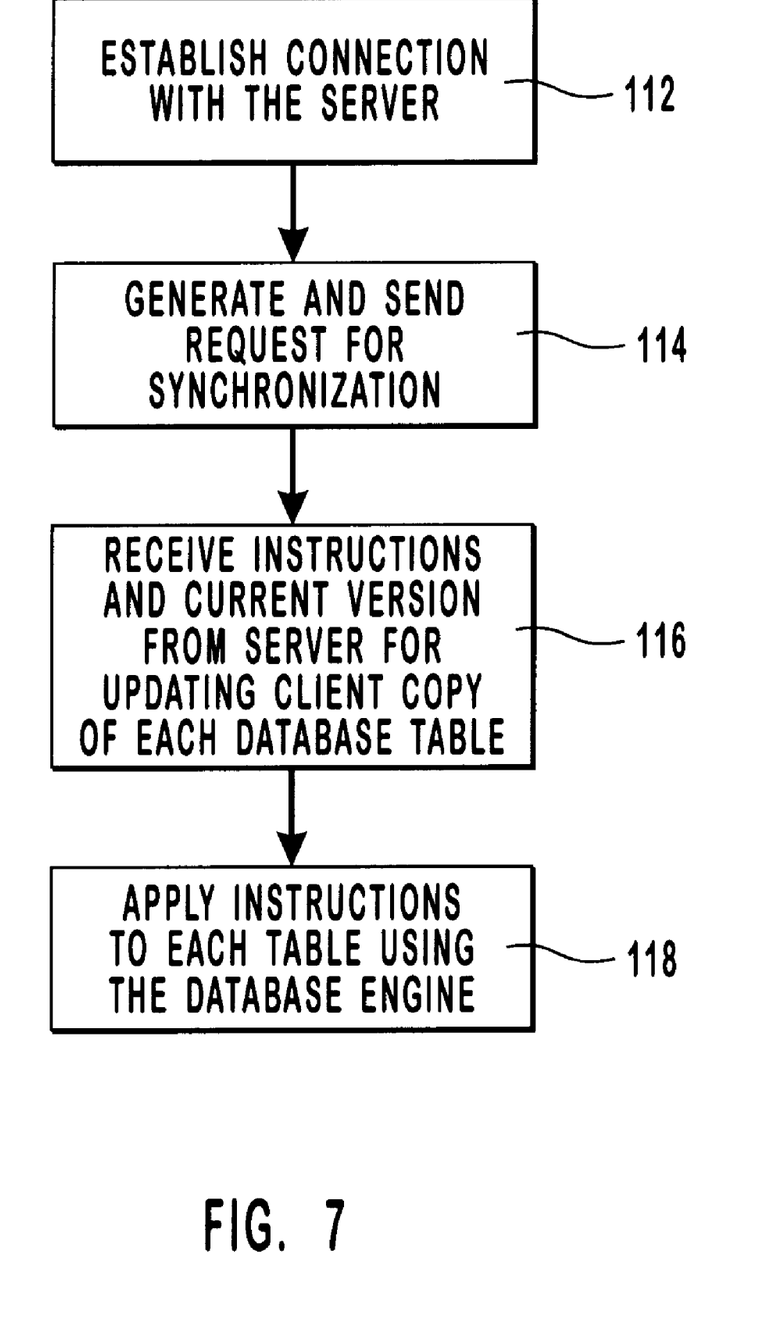
FIG. 7 is a flow chart showing the processing steps taken by a client in order to request and receive the correct differences from a server that may be applied to the client copy of the database table in order to make it current.

Referring now to FIG. 7, a flow chart is shown illustrating the processing steps taken on the client computer for synchronizing the client copy of one or more database tables with the originals of the same found on the server computer. At step 112, the client will establish a connection with the server computer. This may entail a modem to modem connection over telephone line or some other means as was explained previously.

The client will generate and send a request for synchronization to the server computer to be received by the synchronization component 46. The synchronization request will at the very least contain information identifying the client and may contain information regarding the client copies of database tables existing at the client along with associated version numbers, the type of database engine being run at the client, password information, etc.

Once the synchronization request is sent, the client will wait until receiving instructions and the current version number(s) from the server for updating the client copies of each database table contained thereon at step 116. These instructions will be of the appropriate format for the native database engine type found on the client.

Finally, at step 118, the client will operate the database engine and the instructions received previously at step 116, to apply the difference updates and/or copy new tables from the server in order to make each database table current at the client. The client can thus be made in a flexible manner to operate with many different types of database engines without necessarily involving a large amount of redeployment effort at the client. On the other hand, a more sophisticated redeployment effort takes place at the server in order to support the new or different database engine type.

It is apparent that complex and flexible systems may be created using the present invention. With respect to the field service representative example explained previously, a server may hold technical documents in Microsoft® Word™ format (one data store) and a customer database in a SQL database table using a Microsoft® Access® database engine. The client, on the other hand, may manage the client copy of the customer database using a Borland® Paradox® database engine and the client copy of the technical documents using Corel® WordPerfect® or Folio® Infobase® as the appropriate database engine. In the above-mentioned scenario, translation will allow the database change events incorporated as differences in one or more updates to be reflected in instructions of the proper format. Note that in the above example a single client will receive instructions pertaining to two different database engine types.

Those skilled in the art will also see the ability to auto-update the client portion itself so that if a new database engine type is presented or made known to the server, at that point, the server may download a new addition of the client code that will interact with the new database engine type. Furthermore, those skilled in the art will recognize that "applets" as supported by the Java programming language may be used to implement such innovations.

Those skilled in the art will recognize that the methods of the present invention may be incorporated as computer instructions stored as a computer program code means on a computer readable medium such as a magnetic disk, CD-ROM, and other media common in the art or that may yet be developed. Also, computer componentry such as RAM, ROM, EEPROM, etc. may serve as a source of program code means storage or computer readable medium. Combinations of computer readable medium are also contemplated within the scope of this invention. Program code means comprises, for example, executable instructions and data which cause a general purpose or special purpose computer to perform a specific function or functions. Such embodiments of the present invention stored on a computer readable medium constitute an article of manufacture. Additionally, important data structures found in computer hardware memory may be created due to operation of such computer program code means.

A general purpose or special purpose computer running program code becomes a means for accomplishing the functions of the code. In other words, computer software used to perform a particular method step is considered, when executing on a computer, to configure that computer into a means for accomplishing that particular step. Traditional terminology used for describing computers and their relevant parts, such as CPU, etc., are given their ordinary construction as would be understood by one skilled in the art.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of distributing database differences corresponding to change events made to a database table located on a server computer to client copies of the database table located on one or more client computers comprising the steps of:

creating and storing on the server computer one or more sequentially versioned updates, each update containing database differences in a generic format, the database differences corresponding to database change events made to the database table since the preceding update;

receiving, from a client computer, a request for all the database differences needed to make the client copy of the database table current;

determining which updates are necessary for making the client copy of the database table current;

ascertaining a client database engine type wherein the client copy of the database table is held;

generating and translating specific database differences, selected based on the necessary updates, into instructions based on the ascertained database engine type prior to transmission; and transmitting the specific database differences to the client computer so that the client computer may execute the instructions on the client database engine, thereby making the client copy of the database table current in response to the specific database differences translated into the instructions.

2. A method as recited in claim 1 wherein the client database engine type is ascertained by the client computer supplying the client database engine type as part of the request.

3. A method as recited in claim 1 wherein the client database engine type is ascertained by reference to profile information regarding the client computer.

4. A method as recited in claim 1, further comprising the step of receiving from the client computer a plurality of requests for synchronization, wherein the plurality of requests for synchronization are received randomly in time.

5. A method as recited in claim 1 wherein the client is intermittently connected to the server computer.

6. A method of distributing database differences corresponding to database change events made to a database table located on a server computer to client copies of the database table located on one or more client computers, each client computer capable of having different database engines comprising the steps of:

storing database differences at the server computer in a generic format;

receiving from a client computer a request for all database differences needed to make a client copy of the database table current;

translating the differences from the generic format into instructions having a specific format compatible with the type of database engine associated with the client copy of the database table; and transmitting the instructions to the client computer for execution on the client database engine to make the client copy of the database table current.

7. A method as recited in claim 6 wherein the type of database engine is ascertained by the client computer supplying the type of database engine as part of the request.

8. A method as recited in claim 6 wherein the type of database engine is ascertained by reference to profile information regarding the client computer.

9. A method as recited in claim 6 further comprising the steps of:

creating and storing on the server computer one or more sequentially versioned updates containing database differences corresponding to database change events made to the database table since the preceding update;

determining which updates are necessary for making the client copy of the database table current; and generating the database differences based upon the necessary updates prior to the step of translating the differences into instructions.

10. A method as recited in claim 9 wherein the client computer supplies a client version of the client copy of the database table as part of the request and the step of determining which updates are necessary is done by comparing the client version with the latest update version.

11. A method as recited in claim 9 wherein a client version of the client copy of the database table is referenced from client profile information and the step of determining which updates are necessary is done by comparing the client version with a latest update version.

12. A computer-readable medium having computer-executable instructions for performing the steps recited in claim 6.

13. A method as recited in claim 6 wherein the client is intermittently connected to the server computer.

14. A computer program product comprising:

a computer usable medium having computer readable program code means embodied in said medium for distributing database differences corresponding to database change events made to a database table located on a server computer to client copies of the database table located on one or more client computers, each client computer capable of having one or more database engines, said computer readable program code means comprising;

means for creating and storing on the server computer one or more sequentially versioned updates, each update containing database differences that are stored in a generic format and correspond to database change events made to the database table since the preceding update;

means for receiving from a client computer a request for all the database differences needed to make the client copy of the database table current;

means for determining which updates are necessary for making the client copy of the database table current;

means for ascertaining the client database type associated with the client copy of the database table;

means for translating the specific differences based upon the necessary updates from the generic format into instructions having a specific format compatible with the client database type; and means for transmitting the instructions to the client computer for execution on the client database engine to make the client copy of the database table current.

* * * * *